United States Patent [19]

Schein

[11] 3,922,232
[45] Nov. 25, 1975

[54] FLUORESCENT COLORANTS
[75] Inventor: Alan K. Schein, Napa County, Calif.
[73] Assignee: Hercules Incorporated, Wilmington, Del.
[22] Filed: Nov. 23, 1973
[21] Appl. No.: 418,795

[52] U.S. Cl. ...... 252/301.2 R; 260/37 P; 260/40 R; 260/42.21; 260/75 R
[51] Int. Cl.² .................. C08J 3/20; C09K 3/00
[58] Field of Search ............ 252/301.2 R; 260/75 R, 260/40 R

[56] References Cited
UNITED STATES PATENTS

| | | | |
|---|---|---|---|
| 1,852,178 | 4/1932 | May | 260/75 R |
| 2,270,889 | 1/1942 | Nagel et al. | 260/75 R |
| 3,683,048 | 8/1972 | Kolyer et al. | 260/75 N |
| 3,785,989 | 1/1974 | Noetzel et al. | 252/301.2 R |
| 3,812,051 | 5/1974 | Merkle et al. | 260/40 R |

FOREIGN PATENTS OR APPLICATIONS
301,429  2/1930  United Kingdom

OTHER PUBLICATIONS

Berlow et al., The Penta erythritols 1958, Reinhold Publishing Corp. N.Y., N.Y., pp. 259–260.

*Primary Examiner*—Arthur P. Demers
*Attorney, Agent, or Firm*—Hazel L. Deming

[57] ABSTRACT

Improved fluorescent pigments which are particularly useful for coloring thermoplastics are described. The matrix or carrier resin for the fluorescent dye(s) comprises resinous precondensates which are soluble in dimethylformamide and are derived from certain polyfunctional acids and alcohols, and preferably from phthalic anhydride or its esters and pentaerythritol or tris-(2-hydroxyethyl) isocyanurate.

10 Claims, No Drawings

FLUORESCENT COLORANTS

This invention relates to fluorescent colorants which are particularly useful for coloring thermoplastics, and to a process for preparing the fluorescent colorants.

Various resins have the desired properties for use as a carrier or matrix for dyes and some of these have been suggested for use in producing fluorescent colorants or pigments. For example, the thermosetting resins formed by the reaction of a polybasic acid and a polyhydric alcohol or the thermosetting condensation products of urea or melamine with formaldehyde have been suggested as suitable matrices for fluorescent dyes. The thermosetting resins provide infusible and insoluble fluorescent colorants which can be ground to the pigment size particles. However, the pigments in general are not suitable for many applications because of their poor heat stability, short fluorescent life and poor dispersibility with thermoplastic materials.

One method that has been proposed to extend the life of fluorescent pigments is to incorporate the fluorescent dye in a thermoplastic resin formed by the co-condensation of an aminotriazine, formaldehyde and an aryl monosulfonamide. Although these pigments have improved dispersion properties as compared with those from thermosetting resins, they still leave much to be desired. Heat stability is poor and the pigments tend to release formaldehyde under thermoplastic fabrication conditions and to plate out on processing equipment.

It has also been suggested that crosslinked polyester resins derived from aromatic polycarboxylic acids or their anhydrides and polyfunctional alcohols and crosslinked with polyfunctional isocyanates or cyclic di- or tetracarboxylic acid anhydrides can be used as matrices for fluorescent dyes. The crosslinked polyesters give colorants or pigments having improved heat stability as compared with those from the thermoplastic resins. However, the pigments are not readily dispersible in thermoplastic materials and do not provide colors having the brilliance and intensity usually associated with fluorescent dye.

Now in accordance with this invention it has been found that improved fluorescent colorants or pigments having good heat and light stability, long fluorescent life and excellent compatibility with thermoplastic materials can be produced by using as the matrix for a fluorescent dyestuff certain resinous precondensates derived from a polyfunctional acid component and a polyhydroxy compound. Further, it has been found that these fluorescent colorants impart an intense, brilliant fluorescent color to thermoplastics, indicating highly efficient utilization of dye.

Accordingly, the present invention relates to a fluorescent colorant comprising particles of a resinous precondensate colored with a fluorescent dyestuff, said precondensate being a nontacky solid soluble in dimethylformamide at 25°C. and derived from about 0.5 to about 2.0 moles of at least one polyfunctional acid component selected from the group consisting of carboxylic acids, esters and anhydrides, and one mole of at least one polyhydroxy compound, at least one of said polyfunctional acid component or polyhydroxy compound having a functionality greater than 2. This invention also relates to a process for producing a fluorescent colorant comprising a. partially condensing about 0.5 to about 2.0 moles of at least one polyfunctional acid component selected from the group consisting of carboxylic acids, esters and anhydrides with one mole of at least one polyhydroxy compound, at least one of said polyfunctional acid component or polyhydroxy compound having a functionality greater than 2, under controlled condensation conditions to produce a resinous precondensate which is a nontacky solid soluble in dimethylformamide at 25°C., b. introducing a coloring amount of a fluorescent dyestuff into said precondensate, and c. recovering the fluorescent colored precondensate.

The polyfunctional acid component, as stated, comprises at least one polyfunctional carboxylic acid or its ester or anhydride derivatives. Typical acid components include saturated aliphatic acids such as oxalic acid, malonic acid, succinic acid, adipic acid, azelaic acid, malic acid, and acetone dicarboxylic acid, as well as their esters and anhydrides; unsaturated aliphatic acids such as maleic acid, itaconic acid and glutaconic acid and their esters and anhydrides; alicyclic acids, esters and anhydrides and particularly hexahydrophthalic acid, hexahydroisophthalic acid, hexahydroterephthalic acid and pinic acid; aromatic acids such as phthalic acid, terephthalic acid, isophthalic acid and trimeric acid; aromatic esters such as the phthalates, particularly the dialkyl phthalates such as dimethyl isophthalate and dimethylterephthalate; aromatic anhydrides such as phthalic anhydride, tetrachlorophthalic anhydride, 1,2-naphthalic anhydride, 1,8-naphthalic anhydride, trimellitic anhydride and benzene tetracarboxylic dianhydride; and the like. Mixtures of the polyfunctional acids, esters or anhydrides can also be used.

The polyhydroxy compound which is partially condensed with the polyfunctional acid component contains at least two hydroxyl groups and preferably contains three or more hydroxyl groups. Typical polyhydroxy compounds containing three or more hydroxyl groups include aliphatic polyhydroxy compounds such as pentaerythritol, dipentaerythritol, tripentaerythritol, trimethylolethane [i.e., 1,1,1-tris-(hydroxymethyl)-ethane], trimethylolpropane [i.e., 1,1,1-tris-(hydroxymethyl)-propane ], glycerine, and heterocyclic polyhydroxy compounds such as the tris-(hydroxyalkyl) isocyanurates and particularly tris-(2-hydroxyethyl) isocyanurate. Typical polyhydroxy compounds containing two hydroxyl groups include the glycols such as ethylene glycol, propylene glycol, butylene glycol and neopentyl glycol. Mixtures of the polyhydroxy compounds can also be used.

Partial condensation of the polyfunctional acid component and the polyhydroxy compound is carried out conventionally, usually by heating under controlled conditions to assure that the condensation reaction does not proceed to completion. Partial condensation is preferably carried out by heating a mixture of the polyfunctional acid component(s) and polyhydroxy compound(s) at from about 125°C. to about 200°C. using agitation to assure adequate heat transfer and uniform conditions. The temperature and time of heating will vary depending on the degree of precondensation desired, the particular reactants, and whether or not a catalyst is present. Preferably the mixture is heated to a peak temperature ranging from about 150°C. to about 260°C. and the mixture maintained thereat until the desired precondensate has formed, usually from 0.5 to 150 minutes. A small amount (preferably from about 0.01 to about 2% by weight of the reactants) of a condensation catalyst can be used if desired to promote the reaction. Exemplary of condensation catalysts which can be used are the acid catalysts such as the organic sulfonic acids, preferably p-toluene sulfonic acid, sulfuric acid and the like, and the basic catalysts, such as metal salts and preferably lithium acetate, calcium acetate, zinc acetate, manganese acetate, antimony stearate, titanium acetyl acetonate, dibutyl tin oxide and the like.

Partial condensation of the polyfunctional acid component and the polyhydroxy compound in the amounts specified and provided at least one component has a functionality greater than 2 results in normally solid water-insoluble resinous precondensates which are soluble in organic solvents such as methanol, acetone, dimethlformamide and the like. The precondensates usually have softening points above about 60°C. and preferably above about 70°C. The precondensates with softening points above about 80°C. are most preferred since they are extremely stable and resistant to particle agglomeration.

The precondensate can contain one or more ingredients other than those listed and, for example, can be modified by the inclusion of compounds which are reactive with the acid or alcohol components or the precondensate, but which, of course, do not adversely affect the desirable properties of the precondensate. Usually, modifiers are included to increase the molecular weight by chain extension, to introduce other functional groups known to have an affinity for fluorescent dyes, to lower or elevate the softening point of the precondensate, etc. Preferred modifiers are monocarboxylic acids such as stearic acid, benzoic acid and the like, monohydroxy compounds such as stearyl alcohol and the like, polyamines such as, for example, aliphatic, aromatic and N-heterocyclic di- and higher polyamines and monoisocyanates such as stearyl isocyanate. Specific examples of polyamine modifiers are alkylene diamines containing 2 to 16 carbon atoms such as 1,3-propylene diamine, hexamethylene diamine and octamethylene diamine, 2-phenyl-4,6-diamino-s-triazine (also known as benzoguanamine); 1,3-xylylene diamine; melamine and hexamethoxymethyl melamine. The amount of modifier(s) added should not, of course, result in gelation of the precondensate or adversely affect the solubility of the precondensate. Usually the amount of modifier(s) will range from about 1 to about 30 mole percent (preferably about 5 to about 25 mole percent) of the polyfunctional acid component of the precondensate.

Any fluorescent dyes can be used in the practice of the invention. Particularly preferred are the daylight fluorescent-type dyes which belong to the dye families known as rhodamines, fluoresceins, coumarins, naphthalimides, benzoxanthenes and acridines. Typical daylight fluorescent dyes of the above types which are commercially available include Rhodamine BDC (C.I. 45,170), Rhodamine 6GDN extra (C.I. 45,160) and Rhodamine F3B (C.I. 45,175); fluorescein; Maxilion Brilliant Flavine 10GFF; Fluorescent yellow F6PN and Yellow Y toner; Fluorescent Red 66; and 9-aminoacridine. The dyes may be used singly or in combination and may be introduced into the precondensate at any time, i.e., at an intermediate stage or after formation of the precondensate. The dye or dyestuff is preferably added while the precondensate is molten, and most preferably at or near the peak condensation temperature. Usually the dyestuff is added at a temperature below 230°C. and preferably at a temperature ranging from about 150°C. to about 210°C. and agitation is employed to dissolve or disperse the dyestuff uniformly throughout the molten resin. The amount of fluorescent dyestuff added should be a coloring amount and will usually range from about 0.02% to about 25% by weight of the precondensate and preferably will range from about 0.5% by weight. The colored precondensate is recovered conventionally, as by cooling to solidify the resin and comminution. Grinding to the fine particle size usually associated with pigments, however, is not necessary for utilization and in most cases comminuting to particles less than about 1 cm. in size is sufficient.

Conventional additives, such as opacifiers, for example titanium dioxide; processing aids, for example low molecular weight polyethylene and ethylene copolymers, particularly ethylene-vinyl acetate copolymers, ethylene-ethyl acrylate copolymers and ethylene-acrylic acid copolymers; dispersing aids, for example colloidal silica; antioxidants, for example hindered phenols such as pentaerythritol tetraester of 3-(3,5-di-tert-butyl-4-hydroxyphenyl) propionic acid and thioesters such as dilaurylthiodipropionate; ultraviolet screening agents such as 2-hydroxy-4-octyloxy benzophenone; and the like, can also be added to the precondensate or to the final colorant, as desired.

The fluorescent colorants of this invention are useful for coloring paints, lacquers, enamels, inks, rubbers and plastics and are particularly useful for coloring thermoplastic polymers such as polyethylene, polypropylene, polystyrene, nylon 6 and 66, polyesters, poly(vinyl chloride) and acrylic polymers. The fluorescent colorants can be readily incorporated into thermoplastics by dry blending or melt blending and the plastics so colored can be processed conventionally, as by extrusion, injection molding, compression molding or calendering, at temperatures in the range of from about 135°C. to about 320°C. The fluorescent colorants can also be incorporated into plastics using solvent techniques or can be applied to plastics as films or coatings of the colorant using solvent casting techniques. Polar solvents such as ethyl or isopropyl alcohol, acetone, methyl ethyl ketone, ethyl acetate, etc., are particularly useful for the latter application. The colorants of this invention impart to plastics an intense, brilliant fluorescent color at low concentrations. The very intense coloration is especially advantageous in the preparation of colored thin sections, such as films, and it has been found that films containing a small amount of the fluorescent colorant of the invention exhibit a brightness and intensity of color greater than that achieved with an equal quantity of dye alone, i.e., in the absence of a matrix.

The following examples serve to illustrate the invention. In the examples and throughout the specification all parts and percentages are by weight unless otherwise indicated. Softening points are Parr melt bar values determined according to Parr Instrument Company (Moline, Illinois) Bulletin Number 3821, Feb. 1953. Solubility or soluble in a given solvent means complete solubility without gel formation at 25°C. Solubility measurements were made at 10% concentration by stirring one gram of the ground colorant in 10 grams of solvent at 25°C. for one hour or for a shorter period of time if complete solution occurred.

EXAMPLE 1

A reaction vessel equipped with an agitator, heating means and thermometer was charged with 57.2 grams of phthalic anhydride (0.52 mole) and 42.3 grams of pentaerythritol (0.31 mole) and the charge was heated to 238°C., agitation being initiated at the time the charge became molten. Heating was discontinued and 1.0 gram of Rhodamine BDC was added, agitation being continued for 3 additional minutes, following which time the colored molten charge was poured onto an aluminum tray and permitted to cool to room temperature. The solid colorant so produced was ground, giving a bright, bluish-red fluorescent pigment which was soluble in dimethylformamide and acetone and had a softening point of 102°C.

EXAMPLE 2

The procedure of Example 1 was repeated except that the vessel was charged with 56.3 parts of phthalic anhydride, 4.4 parts of 1,2,4,5-benzene tetracarboxylic anhydride and 50.4 parts of pentaerythritol, the charge was heated to 220°C., and 1.1 parts of Rhodamine BDC was added to the charge before heating was discontinued. The product was a bright, bluish-red fluorescent pigment which was soluble in dimethylformamide and methanol and had a softening point of 105°C.

EXAMPLE 3

The procedure of Example 1 was repeated except that the vessel was charged with 75 parts of trimellitic anhydride and 30 parts of propylene glycol, the charge was heated to 165°C., and 10 parts of phthalic anhydride followed by 2 drops of sulfuric acid and finally 1.0 part of Rhodamine BDC were added at minute intervals before heating was terminated. The product was a bright, bluish-red fluorescent pigment which was soluble in dimethylformamide and methanol and had a softening point of 118°C.

EXAMPLES 4–11

In these examples a reaction vessel equipped with thermometer, agitator and heating means and maintained under a nitrogen atmosphere was charged with the acid and alcohol components and the charge was heated to and maintained at 210°C. until the desired degree of precondensation had been reached, at which time heating was discontinued. Agitation was initiated at the time the charge became molten, and continued throughout. The degree of precondensation was determined in advance from a duplicate run by removing a small sample of the charge at given time intervals and measuring the softening point and solubility parameters of the samples. Fluorescent dyestuff was added to the molten precondensate at 210°C. or after partial cooling. The molten colorant was poured onto a tray, permitted to cool to room temperature and then ground into particles. Specific details for these examples and the fluorescent colorants which were obtained are set forth in Table I below.

Table I

| Ex. No. | Acid Component Type[a] | Amount (Parts) | Alcohol Component Type[b] | Amount (Parts) | Catalyst[c] Type | Amount (Parts) | Time at 210°C. (Min.) | Dye Additive Type[e] | Parts | Softening Pt. (°C.) | Solubility (f) | Remarks |
|---|---|---|---|---|---|---|---|---|---|---|---|---|
| 4 | PA<br>DMI | 55.5<br>9.7 | PE | 46.2 | TSA | 0.1 | 14 | A<br>B<br>C | 0.5<br>0.5<br>1.9 | 108 | Yes | Free flowing red powder |
| 5 | PA<br>S | 222.0<br>38.8 | PE | 184.6 | — | — | 75[d] | A<br>B<br>C | 7.24<br>3.49<br>3.27 | 110 | Yes | Orange-red powder |
| 6 | DMI | 263.0 | PE | 184.6 | BTO | 0.5 | 80[d] | A<br>B<br>C | 5.91<br>2.85<br>2.67 | 104 | Yes | Orange-red powder |
| 7 | SA<br>S | 24.0<br>2.5 | THEI | 65.0 | — | — | 135 | D | 2.0 | 84 | Yes | Yellow powder |
| 8 | DMI | 53.3 | TME<br>SAL | 37.5<br>6.0 | BTO | 0.1 | 75 | B<br>C | 1.0<br>1.5 | 79 | Yes | Deep red powder |
| 9 | PA<br>BZ | 55.5<br>9.7 | PE | 23.1 | — | — | 25 | A<br>B<br>C | 1.81<br>0.87<br>0.82 | 117 | Yes | Orange-red powder |
| 10 | PA | 39.0 | THEI | 63.5 | — | — | 85 | A<br>B | 3.4<br>0.1 | 115 | Yes | Orange-yellow powder |
| 11 | PA<br>S | 55.5<br>9.7 | PE | 46.2 | — | — | 47 | A<br>B<br>C | 0.5<br>0.5<br>1.9 | 95 | Yes | Red powder |

Footnotes

[a] PA = phthalic anhydride
DMI = dimethyl isophthalate
S = stearic acid
SA = succinic anhydride
BZ = benzoic acid

[b] PE = pentaerythritol
THEI = tris(2-hydroxyethyl) isocyanurate
TME = 1,1,1-tris(hydroxymethyl)ethane
SAL = stearyl alcohol

[c] TSA = p-toluene sulfonic acid (monohydrate), added when temperature reached 210°C.
BTO = dibutyl tin oxide, added with alcohol and acid.

[d] Dye was added to charge 20 minutes before termination of heating.

[e] A = Maxilon Brilliant Flavine 10GFF (500%)
B = Rhodamine 6GDN Extra
C = Rhodamine F3B
D = Fluorescent Yellow FGPN Table I-continued

| Ex. No. | Acid Component Type(a) | Amount (Parts) | Alcohol Component Type(b) | Amount (Parts) | Catalyst(c) Type | Amount (Parts) | Time at 210°C. (Min.) | Dye Additive Type(e) | Parts | Colorant Properties Softening Pt. (°C.) | Solubility (f) | Remarks |
|---|---|---|---|---|---|---|---|---|---|---|---|---|

(f)Solubility determined in dimethylformamide at 25°C.

EXAMPLE 12

The procedure of Example 10 was repeated except that, following addition of the dyes, heating was discontinued, agitation was increased and when the temperature reaches 175°C., 7.5 parts of an ethylene-vinyl acetate copolymer containing 40% vinyl acetate was added as a processing aid over 2 minutes, agitation being continued for 10 additional minutes before the colorant was poured onto the tray. The product was a freeflowing orange-red powder having a softening point of 109.5°C.

EXAMPLE 13

The procedure of Example 11 was repeated except that, following addition of the dyes, heating was discontinued, agitation was increased, and when the temperature reached 180°C. 10.5 parts of the ethylene-vinyl acetate copolymer of Example 12 was added over 3 minutes and agitation was continued for 10 additional minutes before the colorant was poured onto the tray. The product was a free-flowing red fluorescent powder having a softening point of 89.5°C.

EXAMPLE 14

A reaction vessel equipped with thermometer, agitator and heating means and maintained under a nitrogen atmosphere was charged with 65 parts of dimethylterephthalate, 36 parts of 1,1,1-tris(hydroxymethyl)ethane and 0.1 part of lithium acetate catalyst and the charge was heated to 210°C., agitation being commenced when the charge became molten. Immediately 3 parts of octamethylene diamine was added and the charge was maintained at 210°C. for 28 minutes, after which time heating was discontinued and 0.3 part of Rhodamine BDC and 2 parts of Yellow Y toner were added with agitation. When the temperature of the colored mixture reached 170°C., the mixture was poured onto a tray, permitted to cool to room temperature and then ground into a powder. The product was a bright orange pigment which was soluble in dimethylformamide and had a softening point of 96°C.

EXAMPLE 15

The procedure of Example 14 was repeated except that the vessel was charged with 63 parts of tris(2-hydroxyethyl) isocyanurate, 48 parts of dimethylterephthalate and 0.1 part of titanium acetylacetonate catalyst, 7 parts of stearyl isocyanate was substituted for the 3 parts of octamethylene diamine and the stearyl isocyanate was added to the charge 6 minutes after the temperature had reached 210°C., the temperature thereafter falling to 202°C. over the next 9 minutes. Heating was then discontinued and 0.8 part of Rhodamine F3B, 1.3 parts of Rhodamine 6GDN Extra, 0.8 part of Rhodamine BDC and 7.2 parts of TiO₂ opacifier were added, agitation being continued until the temperature of the mixture reached 183°C. The colored mixture was then poured onto a tray, cooled and ground. The pigment was a blue-red powder and had a softening point of 134.5°C. A 10% solution of the pigment in dimethylformamide at 25°C. was opaque. Filtration gave a clear solution and the insoluble material was identified as TiO₂, indicating that the precondensate was soluble in dimethylformamide.

EXAMPLE 16

The reaction vessel of Example 14 was charged with 222 parts of phthalic anhydride and 392 parts of tris(2-hydroxyethyl) isocyanurate and the charge heated to 200°C. (agitation being employed as soon as the charge became molten) at which temperature 11.6 parts of hexamethoxymethyl melamine was added and the temperature of the mixture was raised to 228°C. Heating was discontinued, and when the temperature of the mixture reached 200°C., 8.6 parts of Rhodamine F3B and 6.2 parts of Rhodamine 6GDN Extra were added, agitation being continued until the temperature reached 166°C., at which point the molten colorant was poured onto a tray, cooled and ground. The product was a fluorescent pink powder which had a softening point of 96°C. and was soluble in dimethylformamide.

EXAMPLE 17

A reaction vessel equipped with thermometer, agitator and heating means was charged with 222 parts of phthalic anhydride and 261 parts of tris(2-hydroxyethyl) isocyanurate and the charge was heated with agitation to 260°C. At this point, 22.4 parts of benzoguanamine were added and the temperature was permitted to return to 260°C. Heating was discontinued and the charge was agitated until the temperature reached 230°C. A portion of the molten charge (380 parts), 3.2 parts of Maxilon Brilliant Flavine (10GFF, 1.55 parts of Rhodamine 6GDN Extra and 1.5 parts of Rhodamine F3B were placed in a can mixer supported in an oil bath at 200°C. and the mixture was stirred for 5 minutes, after which time the mixture was poured onto a tray, cooled and ground. The product was a strongly fluorescent orange-red powder which was soluble in dimethylformamide and had a softening point of 79.5°C.

EXAMPLE 18

A reaction vessel equipped with thermometer, agitator and heating means was charged with 222 parts of phthalic anhydride and 125 parts of 1,1,1-tris(hydroxymethyl)ethane and the charge was heated with agitation until the temperature reached 260°C., at which point 13.9 parts of hexamethylene diamine were added. A portion (190 parts) of the molten charge was transferred to a can mixer (equipped with thermometer) and, when the temperature reached 232°C., 5.15 parts of Maxilon Brilliant Flavine 10GFF, 0.018 part of Rhodamine 6GDN Extra and 5.15 parts of TiO₂ opacifier were added, mixing being continued until the temperature had dropped to 220°C. The molten colorant was then poured onto a tray and cooled and the solid colorant was ground to a pigment. The pigment was an intensely fluorescent chartreuse, free-flowing powder having a softening point of 69°C. The pigment was soluble in dimethylformamide, but gave a slightly opaque solution due to the presence of the $TiO_2$ opacifier.

EXAMPLE 19

The reaction vessel of Example 18 was charged with 222 parts of phthalic annhydride and 136 parts of pentaerythritol, and the charge was heated with agitation to 232°C. at which point 12.5 parts of octamethylene diamine were added and the charge was heated to 260°C. and maintained thereat for 2.5 minutes. A portion of the charge (190 parts) was transferred to a can mixer and, when the temperature reached 232°C., 3.65 parts of Maxilon Brilliant Flavine 10GFF, 1.42 parts of Monastral Green, 0.12 parts of Amazon yellow and 0.38 part of Advabrite were added, mixing being continued until the temperature reached 216°C. The molten colorant was poured onto a tray, cooled and ground to a pigment. The pigment was an intensely colored, fluorescent green, free-flowing powder which was soluble in dimethylformamide and had a softening point of 93°C.

EXAMPLES 20–29

The pigments of Examples 1-4, 7, 12, 14 and 15 were evaluated as colorants for various plastics by blending a small amount of the pigment with the plastic in a Brabender mixing head (Type REE-6/230 V/7 Amp.) rotating at 50 RPM and then pressing the hot blend into 10 or 20 mil sheet using a heated hydraulic press. Details of these evaluations are set forth in Table II.

mold for 4 minutes at 350°F. The resulting sheet one-fourth inch thick) had a brilliant fluorescent orange color.

EXAMPLE 32

The pigment of Example 13 was evaluated as a colorant for low density polyethylene by dry blending 2 parts of the pigment (92% of the particles passed a 28 mesh screen) with 100 parts of the polyethylene and passing the blend through a ¾ inch extruder (L/D ratio 25/1) having zones at 275°, 300°, 325° and 350°F. The ribbon extrudate had a brilliant fluorescent red color.

EXAMPLE 33

In this example, the pigment of Example 5 and a control pigment were evaluated in high density polyethylene. The control pigment was prepared in the exact manner of Example 5 except that: the charge was maintained at 210°C. for 85 minutes before introduction of the dyes, and thereafter was maintained at 210°C. for 13 minutes at which time the mixture became too viscous to stir; and the mixture, following pouring onto the tray and prior to cooling, was placed in an oven at 210°C. for 7 minutes. The control pigment had a softening point of 132°C. and was only partially soluble in dimethylformamide (significant amount of dispersed insoluble gel) and was insoluble in acetone (extensive gel residue). The pigment of Example 5 and the control pigment (maximum particle size of both pigments was less than 0.5 mm.) were evaluated for dispersibility in high density polyethylene at 400°F. in the following manner. High density polyethylene (Marlex) was introduced into a Brabender mixing head and, at the point Table II

| Ex. No. | Plastic[a] | Ex. No. | Colorant Concentration (%) | Colorant Particle Size (mm.) | Blending Conditions Head Temp. °F. | Blending Conditions Time (min.) | Sheet Thickness (mil) | Sheet Color |
|---|---|---|---|---|---|---|---|---|
| 20 | LDPE | 1 | 2 | <0.6 (90%) | 300 | 5 | 20 | Brilliant Purple |
| 21 | PP | 2 | 2 | <0.6 (91%) | 500 | 7 | 20 | Bright Bluish-red |
| 22 | LDPE | 2 | 2 | <0.6 (91%) | 300 | 5 | 20 | Bright Bluish-red |
| 23 | LDPE | 2 | 2 | <0.6 (91%) | 400 | 5 | 20 | Bright Bluish-red |
| 24 | PS | 3 | 2 | <0.6 (89%) | 350 | 5 | 20 | Bright Bluish-red |
| 25 | CAB | 4 | 2 | <0.6 (95%) | 350 | 5 | 20 | Brilliant Red |
| 26 | HDPE | 7 | 2 | <1.65 (99%) | 350 | 5 | 20 | Brilliant Yellow |
| 27 | PP | 12 | 2 | <0.6 (83%) | 500 | 5 | 20 | Brilliant Orange |
| 28 | PVC | 14 | 2 | <0.6 (81%) | 375 | 5 | 70 | Brilliant Orange |
| 29 | PP | 15 | 2 | <0.6 (85%) | 450 | 5 | 6 | Brilliant Magenta |

Footnotes
[a]LDPE = low density polyethylene (DYNH)
PP = polypropylene (Profax 6523)
PS = polystyrene (general purpose)
CAB = cellulose acetate butyrate
HDPE = high density polyethylene (Marlex)
PVC = rigid poly(vinyl chloride) - Union Carbide's Resin QSQH

EXAMPLE 30

A 55% solution of the pigment of Example 8 in ethanol-ethyl acetate (50:50 volume %) was cast as a coating onto 2-mil film of polyethylene and the coating dried. The coated film (coating thickness 0.2 mil) was a brilliant magenta color.

EXAMPLE 31

Sufficient of the pigment of Example 9 (maximum particle size of 100 mesh) was stirred into a poly(vinyl chloride) plastisol (Geon 121) to give a final pigment concentration of 5% and the plastisol cured in a sheet that it became molten, an amount of the pigment equal to 2% by weight of the polyethylene was added, mixing being continued for 5 minutes at 50 RPM. The dispersion was then removed from the Brabender and pressed into 60–80 mil sheets in a heated hydraulic press. Comparison samples were then prepared by laying a section of the sheet containing the pigment of Example 5 in side by side relationship with a section of the sheet containing the control pigment and the unit pressed into a sample of the desired thickness (10 and 20 mils). Visual color observations made on the samples indicated that the portion of the samples containing the pigment of Example 5 had a more brilliant orange fluorescent color than the portion containing the control pigment. The pigment of Example 5 and the control pigment were reground to a maximum particle size of 0.1 mm. and the reground pigments were dispersed in high density polyethylene at 400°F. and the dispersions formed into sheets and comparison samples, as above. The portion of the samples containing the pigment of Example 5 exhibited a more brilliant fluorescent color than the portion of the samples containing the control pigment.

Color intensity evaluations were made on all of the above samples by irradiating the samples with light having a wavelength of 400 millimicrons and then measuring the intensity of light emitted at 592–594 millimicrons. Intensity values for the portion of the samples containing the pigment of Example 5 (before and after regrinding) ranged 18 to 35% higher than those for the portion containing the control pigment.

Microscopic examination of the film samples prepared with the reground pigments revealed that the particles of the pigment of Example 5 were too small to be visible at 640 magnification, whereas the particles of the control pigment were distinctly visible. The control film was not homogeneous in color. Dark particles of about 20 microns were apparent in an otherwise faintly colored film.

EXAMPLE 34

In this example the pigment of Example 6 and a control pigment were evaluated in poly(vinyl chloride). The control pigment was prepared in the exact manner of Example 6 except that the charge was maintained at 210°C. for 20 minutes prior to introduction of the dyes. Just prior to termination of heating, gelation took place very rapidly and the colored charge became rubbery and balled up upon the stirrer. The control pigment had a softening point of 119.5°C. and was insoluble in dimethylformamide, giving a gel suspension.

The pigment of Example 6 and the control pigment were evaluated for dispersibility by blending the pigment at a 2% by weight concentration with plasticized poly(vinyl chloride) in a Brabender mixing head for 5 minutes at 350°F. at 50 RPM, pressing the blend into 60–80 mil sheets and forming 20 mil comparison samples from the sheets in the manner of Example 33. Visual color comparisons made on the samples showed that the pigment of Example 6 was more compatible, gave better color development and greater brilliance than the control pigment. The portion of the sample containing the control pigment was less intense in color, considerably duller and lacked the transparency of the sample containing the pigment of Example 6.

What I claim and desire to protect by Letters Patent is:

1. A fluorescent colorant comprising particles of a resinous precondensate colored with a fluorescent dyestuff, said precondensate being a nontacky solid soluble in acetone and dimethylformamide at 25°C., having a softening point of at least about 70°C. and being derived from about 0.5 to about 2.0 moles of at least one aliphatic, aromatic or alicyclic polyfunctional acid component selected from the group consisting of carboxylic acids, esters and anhydrides and one mole of at least one polyhydroxy compound selected from the group consisting of aliphatic polyhydroxy compounds and tris-(hydroxyalkyl) isocyanurates, at least one of said polyfunctional acid component or polyhydroxy compound having a functionality greater than 2.

2. The colorant of claim 1 wherein at least one acid component is aromatic.

3. The colorant of claim 2 wherein the aromatic acid component is phthalic anhydride.

4. The colorant of claim 2 wherein the aromatic acid component is a dialkyl phthalate.

5. The colorant of claim 2 wherein the polyhydroxy compound is pentaerythritol.

6. The colorant of claim 2 wherein the polyhydroxy compound is tris(2-hydroxyethyl) isocyanurate.

7. The colorant of claim 2 wherein the precondensate is modified with a polyamine.

8. A process for producing a fluorescent colorant comprising
   a. partially condensing about 0.5 to about 2.0 moles of at least one aliphatic, aromatic or alicyclic polyfunctional acid component selected from the group consisting of carboxylic acids, esters and anhydrides with one mole of at least one polyhydroxy compound selected from the group consisting of aliphatic polyhydroxy compounds and tris-(hydroxyalkyl) isocyanurates, at least one of said polyfunctional acid component or polyhydroxy compound having a functionality greater than 2, under controlled condensation conditions to produce a resinous precondensate which is a nontacky solid soluble in acetone and dimethylformamide at 25°C. and has a softening point of at least about 70°C.,
   b. introducing a coloring amount of a fluorescent dyestuff into said precondensate, and
   c. recovering the fluorescent colored precondensate.

9. The process of claim 8 wherein the partial condensation is carried out under molten conditions at a temperature from about 125° to 260°C., and the fluorescent dyestuff is introduced into the molten precondensate.

10. The process of claim 8 wherein the recovered precondensate is comminuted.

* * * * *